United States Patent [19]

Maricle et al.

[11] Patent Number: 4,857,420
[45] Date of Patent: Aug. 15, 1989

[54] METHOD OF MAKING MONOLITHIC SOLID OXIDE FUEL CELL STACK

[75] Inventors: Donald L. Maricle; Richard F. Buswell, both of Glastonbury, Conn.

[73] Assignee: International Fuel Cell Corporation, South Windsor, Conn.

[21] Appl. No.: 107,817

[22] Filed: Oct. 13, 1987

[51] Int. Cl.⁴ .................. H04M 8/10; B05D 5/12
[52] U.S. Cl. ........................... 429/30; 429/32; 29/623.5; 427/115
[58] Field of Search ..................... 429/30-33; 29/623.5; 427/115

[56] References Cited

U.S. PATENT DOCUMENTS

| | | | |
|---|---|---|---|
| 4,468,300 | 8/1984 | Byrne et al. | 204/60 |
| 4,476,196 | 10/1984 | Poppel et al. | 429/33 X |
| 4,476,198 | 10/1984 | Ackerman et al. | 429/32 |
| 4,510,212 | 4/1985 | Fraioli | 429/30 |
| 4,629,537 | 12/1986 | Hsu | 427/115 X |

Primary Examiner—Stephen J. Kalafut
Attorney, Agent, or Firm—William W. Jones; Edward L. Kochey, Jr.

[57] ABSTRACT

The fuel cell stack is made from two basic finished component subassemblies which are stacked repetitively atop each other in alternating fashion. One of the components is an electrode subassembly, and the other is a separator plate-flow field subassembly. The subassemblies are formed from several different material layers which are sintered and shrunk to operating size and density prior to the stack being assembled. The finished subassemblies are layered atop each other to form the stack and then heated to an elevated subsintering temperature and subjected to a light compressive load so that abutting surfaces of the adjacent subassemblies are creep flattened into intimate adherent contact with each other thereby forming a monolithic stack assembly.

18 Claims, 3 Drawing Sheets

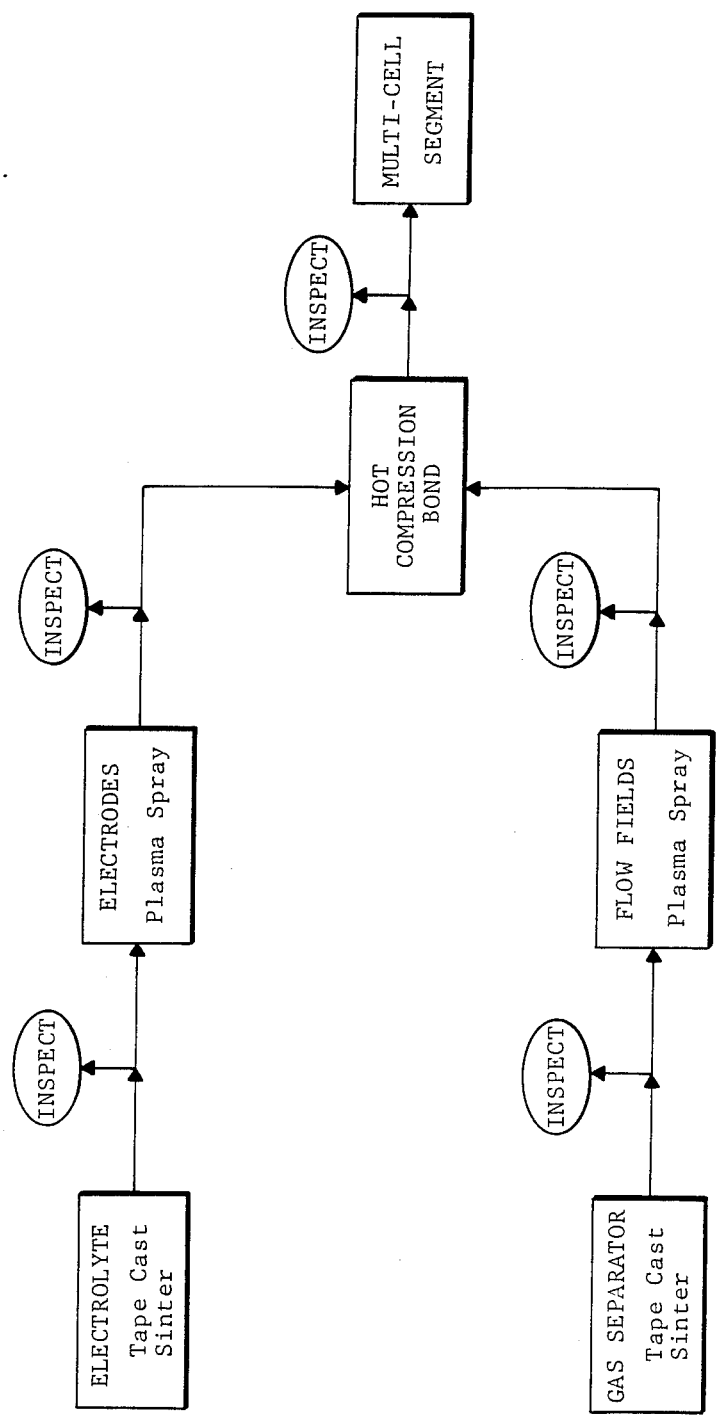

METHOD OF MAKING MONOLITHIC SOLID OXIDE FUEL CELL STACK

DESCRIPTION

1. Technical Field

This invention relates to a method of making a fuel cell stack, and more particularly, to a method for making a monolithic solid oxide fuel cell stack.

2. Background Art

Fuel cell systems which use a fused solid ceramic electrolyte are known in the prior art, and are collectively referred to as solid oxide fuel cell systems. The geometry of the prior art solid oxide fuel cell systems is varied, from cylindrical configurations, to corrugated plate configurations, to more conventional flat plate configurations. The cylindrical configurations and corrugated plate configurations have inherently complicated reactant manifolding systems which are the direct result of the geometry of the cell structures.

The prior art flat plate solid oxide fuel cell stacks, such as shown in U.S. Pat. No. 4,476,196 Paeppel et al., utilize a more conventional cross flow pattern for the reactants which is identical to that used in the prior art acid fuel cell stacks, and thus the reactant manifolding is rendered much simpler and less complex in a stack such as is shown in the U.S. Pat. No. 4,476,196 patent, as compared to the cylindrical or corrugated solid oxide stacks. Theoretically, the fuel cell stack structure shown in the above-noted patent should provide exemplary power density, however, such is not the case when following the teachings of the patent. The problems arise because the fuel cell stack shown in the U.S. Pat. No. 4,476,196 patent is formed from extruded arrays of anode and cathode materials in pliant or green form, while the thinner layers of electrolyte and interconnect materials are tape cast. The tapes from which the electrolyte and interconnect layers are initially formed are also green, unsintered materials. The various green constituent layers are then stacked on top of each other, appropriately oriented, to form the stack structure. The resultant stack structure is made up of all green, or unsintered, constituent parts. As noted, the components of the stack are made of different materials, and the patent cautions one to try to match the coefficient of thermal expansion and firing shrinkage for the different materials as closely as possible to one another to minimize separation problems. Despite taking all precautions advised, stacks as shown in the U.S. Pat. No. 4,476,196 patent which are made of green precursors which are all cosintered as taught by the patent display undesirably poor performance due to micro-cracks which occur in the various layers as a result of the cosintering step. Experience has shown that a cosintered stack will only produce about 10-30% of its theoretical current density due to mixing of reactant gases which is the direct result of the micro-cracks in the stack.

DISCLOSURE OF THE INVENTION

This invention relates to a method for making a solid oxide fuel cell stack which has the configuration of that shown in the U.S. Pat. No. 4,476,196 patent, but which will display remarkably improved performance as compared to a stack made according to the procedures described in the aforesaid patent. A stack formed in accordance with this invention is made from preformed, presintered subassembles, of which there are two different kinds. One of the subassemblies is an electrode subassembly, and includes an electrolyte layer which is formed from a green tape and then sintered prior to any further processing step. After the electrolyte layer has been sintered, a finished anode layer will be formed on one face of the electrolyte layer, and a finished cathode layer will be formed on the opposite face of the electrolyte layer. The two electrode layers can be plasma sprayed onto the electrolyte layer, or can be separately laid down as green tapes and sintered in situ. This three layer sintered and densified component will serve as the electrode subassembly of the fuel cell stack. The other subassembly which is similarly preformed is the combined separator-flow field subassembly. This second subassembly is formed by providing a green tape preform of interconnect material for the separator layer, and sintering that preform tape to its final fused and densified form. After performing the sintering step, the ribbed cathode and anode flow field layers are formed on opposite sides of the separator layer. These flow field layers can be formed by plasma spraying; or with green tapes which are then sintered and densified in an appropriate manner; or by some other similar step. The ribs in the flow field layers can be formed with tape strips, by plasma spraying through a mask or stencil, or by an etching or grooving step. The stack is formed by stacking these prefinished subassemblies on top of each other in the proper order and in proper orientation. The final forming step involves heating the stacked subassemblies to a subsintering temperature which is high enough to soften the presintered structures so that they will form intimately conforming interfaces through the phenomenon known as creep flattening. Edge sealed joints can be formed in this creep flattening step, and, if necessary, thin layers of conductive braze, such as platinum, or the like can be applied to the abutting surfaces of the subassemblies prior to the staking step. The result of the creep flattening step is a monolithic stack substantially as shown in the U.S. Pat. No. 4,476,196 patent, but without the myriad of micro-cracks which will be found in the stack formed by the procedure described in the patent.

It is therefore an object of this invention to provide a method for making an improved solid oxide fuel cell stack which is amenable to simple reactant feeding and manifolding.

It is a further object of this invention to provide a method of the character described which results in a stack that is relatively free from micro-cracks in its component layers.

It is another object of this invention to provide a method of the character described which allows for assembly line production of the stacks from preformed subassemblies.

It is an additional object of this invention to provide a method of the character described wherein each layer of each subassembly can be individually formed to final specifications under conditions which are most beneficial to achieving the respective final specifications.

These and other objects and advantages of the invention will become more readily apparent from the following detailed description thereof, when taken in conjunction with the accompanying drawings.

BRIEF DESCRIPTION OF THE DRAWINGS

FIG. 5 is a schematic flow sheet describing the manufacturing procedure used to produce the fuel cell power system of this invention.

BEST MODE FOR CARRYING OUT THE INVENTION

Figure 1:
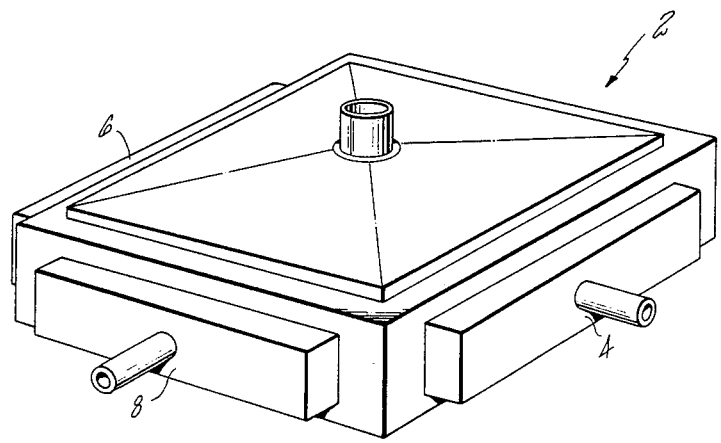
FIG. 1 is a perspective view of a fuel cell stack formed in accordance with the invention showing the reactant manifold system used.

Referring now to FIG. 1, there is shown the exterior of a solid oxide fuel cell stack which is constructed in accordance with this invention and which has been manifolded for passage of the reactants through the stack with basically the same type of side manifolds which are used in conventional acid or alkaline fuel cell stacks. The stack, denoted generally by the numeral 2, is formed from flat, square components which allows side manifolds to be used to provide the flow of reactant gases. For example, the manifold 4 can be the hydrogen inlet manifold and the manifold 6 can be the hydrogen outlet or exhaust manifold. Likewise, the manifold 8 can be the oxygen inlet manifold and a manifold (not shown) on the opposite side of the stack 2 can be the oxygen outlet or exhaust manifold.

Figure 2:
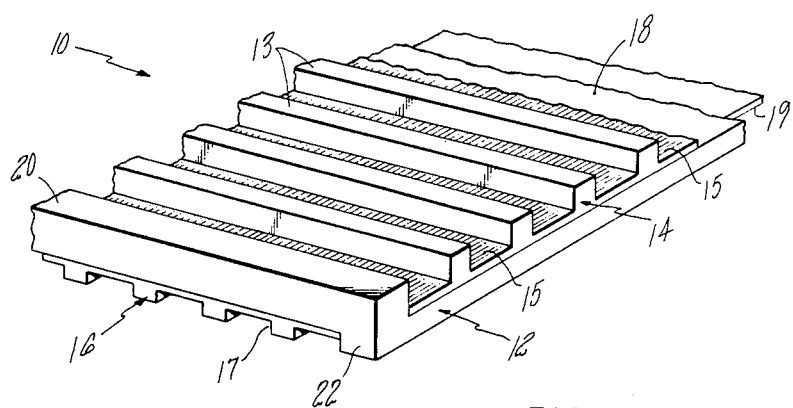
FIG. 2 is a fragmented perspective view of the gas separator-flow field subassembly used to build the stack of this invention.

Referring to FIG. 2, there is shown the gas separator-reactant flow field subassembly, denoted generally by the numeral 10, which is used in constructing the power system of this invention. This subassembly 10 is formed from a core gas separator plate 12 and two ribbed flow field plates 14 and 16. The separator plate 12 has a thin central web portion 18, a first opposed pair of edge sealing flanges 20 (only one of which is shown) and a second opposed pair of edge sealing flanges 22 (only one of which is shown). It will be noted that the pairs of sealing flanges 20 and 22 seal off side edges of the reactant flow field against lateral gas diffusion out of the flow field. The central web portion 18 is made from a green Mg doped $LaCrO_3$ sheet cut to size, and the seal flanges 20 and 22 are formed from strips of the same green sheet material which are laid on the edges of the sheet and overlaid to obtain the desired sealing rib thicknesses. This green composite member is then sintered in a hydrogen atmosphere at a temperature in the range of about 1650° C. to about 1750° C., preferably at 1650° C. to a density of 94%–96% of theoretical density. The ribbed flow field plate 14 provides the hydrogen flow field. The plate 14 is formed from nickel oxide zirconia anode electrode material, which is deposited on the separator plate web 18 after the separator plate has been sintered. Preferably the plate 14 will be deposited by plasma spraying the anode electrode material. The entire surface of the web 18 is thus coated with a basal layer 15 of anode electrode material approximately 3–10 mils in thickness, and then the ribs 13 are built-up on this basal layer. The ribs 13 can be formed by plasma spraying the anode electrode material through a mask or stencil. They could also be formed by machining or etching a thicker layer of the material, but plasma spraying with a mask is preferred. The flow field plate 16 provides the oxygen or air flow field and is formed from strontium doped lanthanum manganate cathode electrode material. The oxygen flow field plate 16 will be formed preferably by plasma spraying the cathode material in the same manner described for the hydrogen flow field plate 14 with ribs 17 built up on the basal layer. The flow field plates will have densities in the range of 20% to 50% of theoretical density and preferably about 30%.

Figure 3:
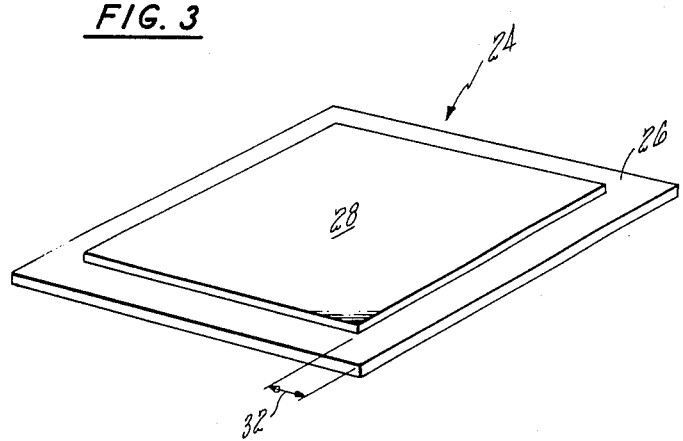
FIG. 3 is a perspective view of the basic electrode subassembly used to build the stack of this invention.

Referring now to FIG. 3, the electrode subassembly, denoted generally by the numeral 24, is shown. The electrode subassembly 24 includes an electrolyte plate 26, an anode electrode layer 28, and a cathode electrode layer 30 (See FIG. 4). The electrolyte plate is formed from a green cut and sized tape of yttria stabilized zirconia electrolyte material. The green tape is sintered in an air (oxidizing) atmosphere at a temperature in the range of about 1400° C. to about 1600° C., preferably at 1400° C. to approximately 94%–96% of theoretical density, and creep flattened. The anode electrode layer 28 is nickel oxide zirconia which is plasma sprayed onto the sintered electrolyte plate 26 and the cathode electrode layer 30 is strontium doped lanthanum manganate which is plasma sprayed on the opposite side of the plate 26. It will be noted that an electrode-free skirt 32 will be left at the edges of the plate 26 for sealing purposes as will be pointed out hereinafter. The anode and cathode material will have a density in the range of 20%–50% of theoretical density and preferably about 30%.

Figure 4:
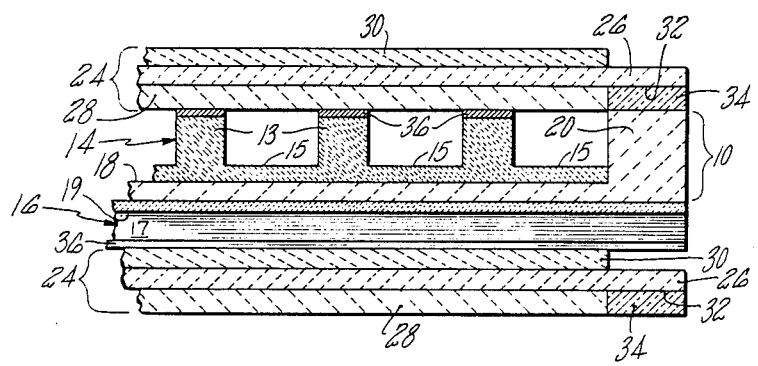
FIG. 4 is a fragmented sectional view of the two subassemblies joined together to form a cell.

Referring now to FIG. 4, a portion of an assembled monolithic stack is shown. It will be noted that the subassemblies 10 and 24 are merely stacked one atop another in proper orientation to form the stack. Glass sealing gaskets 34 are used to seal the flanges 20 and 22 to the skirt edges 32 of the electrolyte plates 26 and layers of platinum paste 36 may be used to improve the bond and electrical conductivity between the ribs and electrode layers of the subassemblies 10 and 24 in the active area thereof. The assembled stack is then heated to a temperature in the range of about 1000° C. to about 1200° C., preferably 1000° C., for up to an hour, and is subjected to a light compressive load in the range of about 1 to about 10 psi to bond the subassemblies together, and to ensure conformity of all contact surfaces between the subassemblies by creep flattening. The phrase "creep flattening" refers to a conforming of the contacting surfaces, into intimate flat contact with each other which occurs when the assembled stack is heated to temperatures which soften its component parts.

It will be noted from FIG. 4 that the ribs 13 on the hydrogen flow field plate 14 are higher than the ribs 17 on the oxygen flow field plate 16. This relationship will be utilized when the power module is intended for use in space, as for example, in orbiting vehicles, and will be run on relativley pure hydrogen and relatively pure oxygen, rather than hydrocarbon fuel and air. In such a case, the hydrogen will serve as the fuel gas and will also serve as the coolant for the stack. The oxygen, on the other hand, does not serve a dual function, thus the oxygen flow channels can be made more shallow. This allows compaction of the stack, and allows more cells be placed in any given height increment of the stack. Shorter conductance paths are also created, thus lowering iR losses. This unequal flow field geometry cannot be achieved using the prior art corrugated electrode sheets and thus optimum performance cannot be realized when a corrugated cell system is used in an environment where the hydrogen will be the coolant as well as the fuel.

It will be noted that the ability to form the stack components as separate subassemblies has another advantage. As set forth above, the sintering temperature of the gas separator plate is substantially higher than the sintering temperature of the electrolyte, and the plasma spraying temperatures. When the several cell components are co-sintered in one operation, as with the corrugated and cylindrical solid oxide cell structures, the co-sintering tends to stimulate diffusion of the lanthanum manganate cathode material into the zirconia electrolyte, which is an undesirable phenomenon. This will not occur with the fabrication techniques made possible by the cell structure of this invention. The retention of the basal layer of the electrode material in the bottoms of the reactant flow channels provides additional in-plane conductivity for the flow field plates and compensates for the poor conductivity of the gas separator plate. This also lowers iR losses.

The preferred thicknesses of the various layers of cell material are as follows: 2–10 mils for the gas separator plate; 40 mils for the hydrogen and oxygen flow field plates if both are the same thickness; and 40 mils for the hydrogen flow field plate with 5 mils for the oxygen flow field plate when the hydrogen is both fuel and coolant; 1–5 mils for the basal layer in both of the flow field plates; 2–4 mils for the electrolyte plate; 1–3 mils for the anode electrode; and 1–3 mils for the cathode electrode.

Referring now to FIG. 5, there is shown schematically a production format for producing and assembling the subassemblies and the stacks according to this invention. The two subassembly production lines can be operated in parallel, and can be merged at the stack monolith forming station. When produced in accordance with this invention, each part can be individually inspected and tested before proceeding to the next step. Such a procedure cannot be followed with the corrugated or cylindrical geometries of the prior art, or with the procedure described in U.S. Pat. No. 4,476,196 since there are no sintered parts until the entire monolith has been sintered. This ability to perform a complete and thorough inspection of all of the components is another advantage of using subassemblies to form the solid oxide fuel cell modules in accordance with this invention.

Another significant advantage which accrues from the use of subassemblies to form the solid oxide fuel cell stack is the opportunity to employ different fabrication processes for each layer. For example, the electrolyte and interconnect layers can be formed by plasma spraying, chemical vapor or arc deposition onto a fugative substrate rather than tape casting and sintering. Electrode material layers can be screen printed, slurry cast as well as plasma sprayed. This allows fabrication by the most cost effective method.

Since many changes and variations of the disclosed embodiments of the invention may be made without departing from the inventive concept, it is not intended to limit the invention otherwise than as required by the appended claims.

We claim:

1. A method for forming a monolithic solid oxide fuel cell stack, said method comprising the steps of:
   (a) forming a plurality of electrode subassemblies by:
      (i) providing appropriately sized green unsintered tapes of solid oxide electrolyte material;
      (ii) sintering said tapes to form sintered plates of said electrolyte material of appropriate operational density;
      (iii) forming a finished layer of anode material on one surface of said sintered electrolyte plates; and
      (iv) forming a finished layer of cathode material on an opposite surface of said sintered electrolyte plates;
   (b) forming a plurality of gas separator-reactant flow field subassemblies by:
      (i) providing appropriately sized green unsintered sheets of interconnect material;
      (ii) sintering said sheets to form laminae of said interconnect material of appropriate operational density;
      (iii) forming a finished anode flow field layer of anode material on one surface of said laminae, said anode flow field layers including a plurality of parallel ribs and intervening grooves extending across said laminae in a first direction; and
      (iv) forming a finished cathode flow field layer on an opposite surface of said laminae, said cathode flow field layers including a plurality of parallel ribs and intervening grooves extending across said laminae in a second direction perpendicular to said first direction;
   (c) stacking said electrode subassemblies and said gas separator-reactant flow field subassemblies one atop the other in alternating fashion with said cathode material layers abutting said cathode flow field layers, and with anode material layers abutting said anode flow field layers to form a stack preassembly;
   (d) heating said stack preassembly to an elevated subsintering temperature thereby softening said subassemblies and creep flattening the latter to form intimate interfacial contact between said subassemblies; and
   (e) applying a light compressive load axially of said stack preassembly during said heating step to cause said subassemblies to fuse together to form a monolithic stack structure.

2. The method of claim 1 including:
   sintering said green electrolyte tapes at a temperature in the range of about 1400° C. to about 1600° C., and sintering said interconnect material sheets at a temperature in the range of about 1650° C. to about 1750° C.

3. The method of claim 1 wherein the steps of forming said finished layers of anodes and cathode material comprise plasma spraying onto said sintered electrolyte plates.

4. The method of claim 1 wherein the steps of forming said finished anode and cathode flow field layers comprise plasma spraying onto said sintered laminae of interconnect material.

5. The method of claim 4 including plasma spraying said plurality of parallel ribs of said anode and cathode flow field layers through a mask.

6. The method of claim I wherein said subsintering temperature is in the range of about 1000° C. to about 1200° C.

7. The method of claim 1 including:
   forming said plurality of ribs of said anode flow field to a height greater than the height of said ribs in said cathode flow field.

8. A method for forming a monolithic solid oxide fuel cell stack, said method comprising the steps of:
  (a) forming a plurality of electrodes subassemblies by:
    (i) providing appropriately sized green unsintered tapes of solid oxide electrolyte material;
    (ii) sintering said tapes at a temperature in the range of about 1400° C. to about 1600° C. to form sintered plates of said electrolyte material of appropriate operational density;
    (iii) forming a finished layer of anode material on one surface of said sintered electrolyte plates by plasma spraying said anode material onto said one surface of said plates; and
    (iv) forming a finished layer of cathode material on an opposite surface of said sintered electrolyte plates by plasma spraying said cathode material onto said opposite surface of said plates;
  (b) forming a plurality of gas separator-reactant flow field subassemblies by:
    (i) providing appropriately sized green unsintered sheets of interconnect material;
    (ii) sintering said sheets at a temperature in the range of about 1650° C. to about 1750° C. to form sintered laminae of said interconnect material of appropriate operational density;
    (iii) forming a finished anode flow field layer of anode material on one surface of said laminae by plasma spraying said anode material onto said one surface of said laminae; and
    (iv) forming a finished cathode flow field layer of cathode material on an opposite surface of said laminae by plasma spraying said cathode material onto said opposite surface of said laminae;
  (c) stacking said electrode subassemblies and said gas separator-reactant flow field subassemblies one atop the other in alternating fashion with said cathode material layers abutting said cathode flow field layers, and with said anode material layers abutting said anode flow field layers to form a stack preassembly; and
  (d) heating said stack preassembly to a subsintering temperature in the range of about 1000° C. to about 1200° C. while applying a relatively light compressive load to said stack preassembly to creep flatten said subassemblies into intimate interfacial contact with each other and to cause said subassemblies to fuse together to form a monolithic stack structure.

9. The method of claim 8 further comprising the step of applying a layer of conductive braze to each interface between adjacent subassemblies prior to said stacking step to improve the strength of the fusing bond between the subassemblies in the monolithic stack.

10. The method of claim 8 wherein the steps of forming said anode and cathode flow field layers comprise plasma spraying onto said laminae through a mask to form ribs and intervening grooves in said flow field layers.

11. A method for making a solid oxide fuel cell stack subassembly for use in forming a monolithic solid oxide fuel cell stack, said method comprising the steps of:
  (a) providing a thin planar body of green unsintered ceramic interconnect material which forms a core sheet for said subassembly;
  (b) sintering said body of green unsintered ceramic material to form a sintered sheet of ceramic material of appropriate operational density;
  (c) plasma spraying a layer of cathode material onto one side of said sintered sheet of ceramic material, and forming raised ribs with intervening grooves; and
  (d) plasma spraying a layer of anode material onto an opposite side of said sintered sheet of ceramic material, and forming raised ribs with intervening grooves the result being a shelf supporting gas separator - reactant field subassembly having a sintered ceramic core sheet and opposed outer layers of cathode and anode material, all of which are of appropriate operational density for use in a solid oxide fuel cell stack.

12. The method of claim 11 further comprising the step of applying a layer of conductive braze to the outermost contact surface of said anode material layer and said cathode material layer.

13. The method of claim 11 wherein said ceramic material is an electrolyte, and said subassembly is an electrode subassembly.

14. A self supporting finished subassembly for use in forming a monolithic solid oxide fuel cell stack, said subassembly comprising:
  (a) a core sheet of ceramic interconnect material which has been sintered to fuse said ceramic material into a coherent mass of appropriate operational density suitable for use in a fuel cell stack;
  (b) a layer of anode material applied to one side of said core sheet after the latter has been sintered, to form a coherent first outer layer of anode material, with raised ribs and intervening grooves, of appropriate operational density suitable for use in a fuel cell stack; and
  (c) a layer of cathode material applied to an opposite side of said core sheet after the latter has been sintered, to form a coherent second outer layer of cathode material, with raised ribs and intervening grooves, of appropriate operational density suitable for use in a fuel cell stack, said subassembly being coherent and self supporting gas separator - reactant flow field subassembly and operable for building a solid oxide fuel cell stack by stacking the subassemblies one atop another.

15. The subassembly of claim 14 further comprising layers of conductive braze applied to outer surfaces of said anode and cathode material layers.

16. The subassembly of claim 14 said ceramic material forming said core sheet is an electrolyte ceramic, and said subassembly is an electrode subassembly.

17. The subassembly of claim 14 wherein said anode and cathode material layers are plasma sprayed onto said ceramic core sheet.

18. A subassembly as in claim 14, wherein:
  said raised ribs of said layer of anode material are of greater height than said raised ribs of cathode material.

* * * * *